TELEVISION TRANSMITTER WITH IMPROVED AMPLITUDE LINEARITY

Filed June 21, 1955 2 Sheets-Sheet 1

INVENTOR.
WENDELL C. MORRISON
BY
Charles H. Brown
ATTORNEY

May 20, 1958 W. C. MORRISON 2,835,869

TELEVISION TRANSMITTER WITH IMPROVED AMPLITUDE LINEARITY

Filed June 21, 1955 2 Sheets-Sheet 2

INVENTOR.
WENDELL C. MORRISON
BY
Charles H. Brown
ATTORNEY

United States Patent Office 2,835,869

Patented May 20, 1958

2,835,869

TELEVISION TRANSMITTER WITH IMPROVED AMPLITUDE LINEARITY

Wendell C. Morrison, Princeton, N. J., assignor to Radio Corporation of America, a corporation of Delaware Application June 21, 1955, Serial No. 517,009

11 Claims. (Cl. 332—37)

This invention relates to radio transmitters, and more particularly to a television transmitter including means to improve the amplitude linearity between the video input signal and the modulated radio frequency output signal.

In a television transmitter, the visual radio frequency carrier is modulated according to a video signal including component frequencies between zero and about 4 megacycles. Ideally, the modulation envelope of the radio frequency carrier should vary linearly with the amplitude of the video signal. In practice, however, the relationship is not linear, and high amplitudes of the video signal result in less than correspondingly high amplitudes of the modulated radio frequency carrier. The non-linearity results from inherent characteristics of the modulator, the modulated amplifier and succeeding radio frequency amplifiers. Negative feed-back cannot be used to achieve a linear relationship because the modulation frequencies extend up to about 4 megacycles, and the time required for a signal to go thru the circuit including a feed-back loop is appreciable compared with the period of one cycle at 4 megacycles. Therefore, ghost images appear on television receiver screens if appreciable negative feed-back is used at the transmitter.

It is therefore a general object of this invention to provide a television transmitter having improved amplitude linearity between the video input signal and the modulated radio frequency output carrier.

It is another object to provide an improved system for modulating a radio frequency carrier with a wide band modulating signal.

According to an illustrative embodiment of the invention, a television transmitter includes a modulator coupled to a modulated amplifier. A video signal is applied to the modulator and a radio frequency carrier wave is applied to the modulated amplifier. A modulated radio frequency wave is obtained from the modulated amplifier. The original video signal and a video signal derived by demodulating a portion of the modulated wave obtained from the modulated amplifier are compared in a differential amplifier to produce a video signal corresponding with the instantaneous difference between the two signals which occurs at high levels of the video signal. The difference signal is applied as a modulating signal to a variable gain amplifier which also receives the radio frequency carrier wave. The modulated radio frequency output of the variable gain amplifier is combined with the output of the modulated amplifier to provide a combined modulated radio frequency wave having an amplitude varying substantially linearly with the video signal.

Other objects and aspect of the invention will be apparent to those skilled in the art from the following more detailed description taken in conjunction with the appended drawings, wherein.

Figure 1:
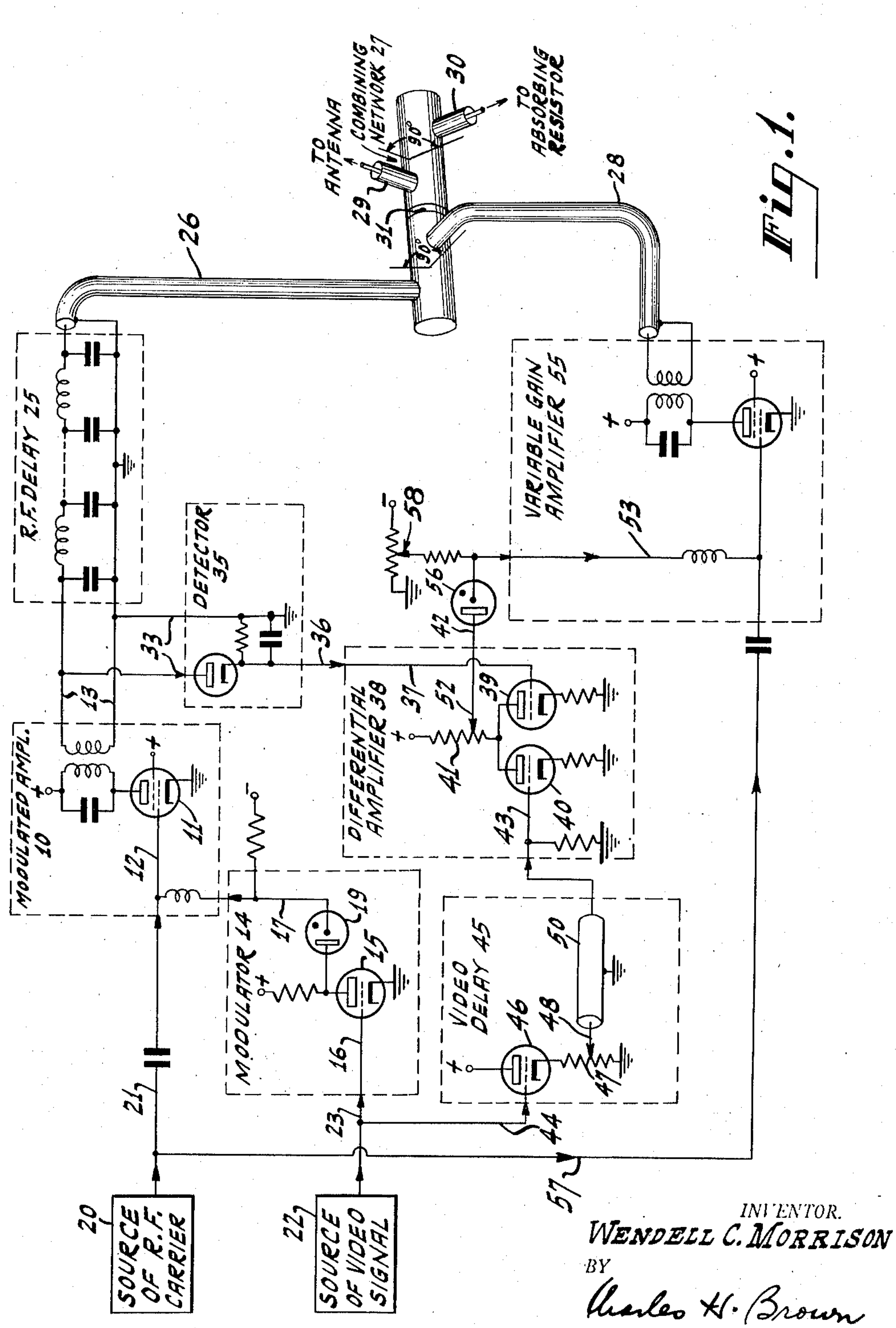
Figure 1 is a schematic circuit diagram of a transmitter constructed according to the teachings of this invention.

Referring to the drawings, a modulated amplifier 10 is represented by a circuit including a vacuum tube 11 having an input lead 12 and output leads 13. A radio frequency power amplifier may be inserted in the leads 13 if desired. A modulator 14 includes a vacuum tube 15 having an input lead 16 and an output lead 17. The output lead 17 of modulator 14 is connected thru a radio frequency choke coil to the input lead 12 of the modulated amplifier 10. A radio frequency carrier wave from a source 20 is applied over lead 21 to the input lead 12 of the modulated amplifier 10. A video signal from a source 22 is applied over lead 23 to the input lead 16 of the modulator 14. The circuit as thus far described is illustrative of a conventional television transmitter wherein the radio frequency carrier is modulated in the modulated amplifier 10 by a video signal applied thru the modulator 14 to the modulated amplifier 10. The modulated radio frequency signal appearing on the output leads 13 of the modulated amplifier 10 has a video modulation envelope which does not exactly correspond with the video signal from the source 22 at high amplitudes of the video signal. High amplitudes of the video signal result in less than correspondingly high amplitudes of the modulated radio frequency signal. According to the invention, means are provided to maintain a substantially linear relationship between the amplitude of the video signal from source 22 and the amplitude of the modulated radio frequency wave applied to the radiating antenna which receives the output from the modulated amplifier.

The output of the modulated amplifier 10 on leads 13 is applied thru a radio frequency delay line 25 and thru a coaxial line 26 to an input of a combining network 27. The combining network 27 includes a second input coaxial line 28, and output coaxial line 29 for connection to an antenna (not shown), and a second output coaxial line 30 for connection to an absorbing resistor (not shown). The combining network 27 includes a rotatable joint designated 31. The network may be of the type shown in Figure 5 of copending patent application Serial No. 431,167, filed on May 20, 1954 by George A. Olive, and assigned to the assignee of this application. Said application ripened on August 14, 1956, into Patent No. 2,759,099. Various forms of combining networks may be employed in place of the type shown in the drawing. However, the type of combining network shown is particularly advantageous in that adjustments may conveniently be made in accordance with the power required from a variable gain amplifier to be described.

A portion of the modulated radio frequency signal on the output leads 13 of the modulated amplifier 10 is applied over leads 33 to a detector or demodulator 35. The output of the detector 35 on the lead 36 is a video signal corresponding with the modulation envelope of the radio frequency wave, and this signal is applied to one input lead 37 of a differential amplifier 38. The differential amplifier or signal comparing circuit 38 includes two vacuum tubes 39 and 40 having a common output impedance 41 from which an output signal is taken over a variable tap 52 and lead 42. Input lead 37 is connected to the grid of tube 39. A second input signal to the differential amplifier 38 is applied over a lead 43 to the grid of tube 40. The second input signal is obtained from the video signal source 22 and is applied over lead 44 and thru a video delay device 45 to the input lead 43. The video delay device includes a cathode follower tube 46 having a cathode resistor 47. A variable tap 48 on the cathode resistor 47 is connected to a video delay line 50. It should be apparent that the modulation envelope of the modulated radio frequency wave from the modulated amplifier 10 (derived by means of detector 35) is applied to one input of the differential amplifier 38 for comparison with the original video signal from the source 22 applied thru the delay device 45 to the other input of the differential amplifier 38. The two video signals applied to the differential amplifier are of opposite polarity.

An output is obtained from the differential amplifier 38 by means of a variable tap 52 and applied over leads 42 and 53 to the input of a variable gain amplifier 55. The variable gain amplifier 55 includes an adjustable grid biasing arrangement 58, and includes an output coaxial line 28 connected to an input of the combining network 27. The coupling from the differential amplifier 38 to the input of the variable gain amplifier 55 may include a voltage regulator tube 56 to maintain the appropriate direct current potential difference between the two circuits while permitting signals to be coupled therethru. A similar coupling tube 19 is shown in the modulator 14. Other means for obtaining the same result are well known and may be used. A portion of the radio frequency carrier from the source 20 is also applied over the lead 57 to the input of the variable gain amplifier 55.

Figure 2:
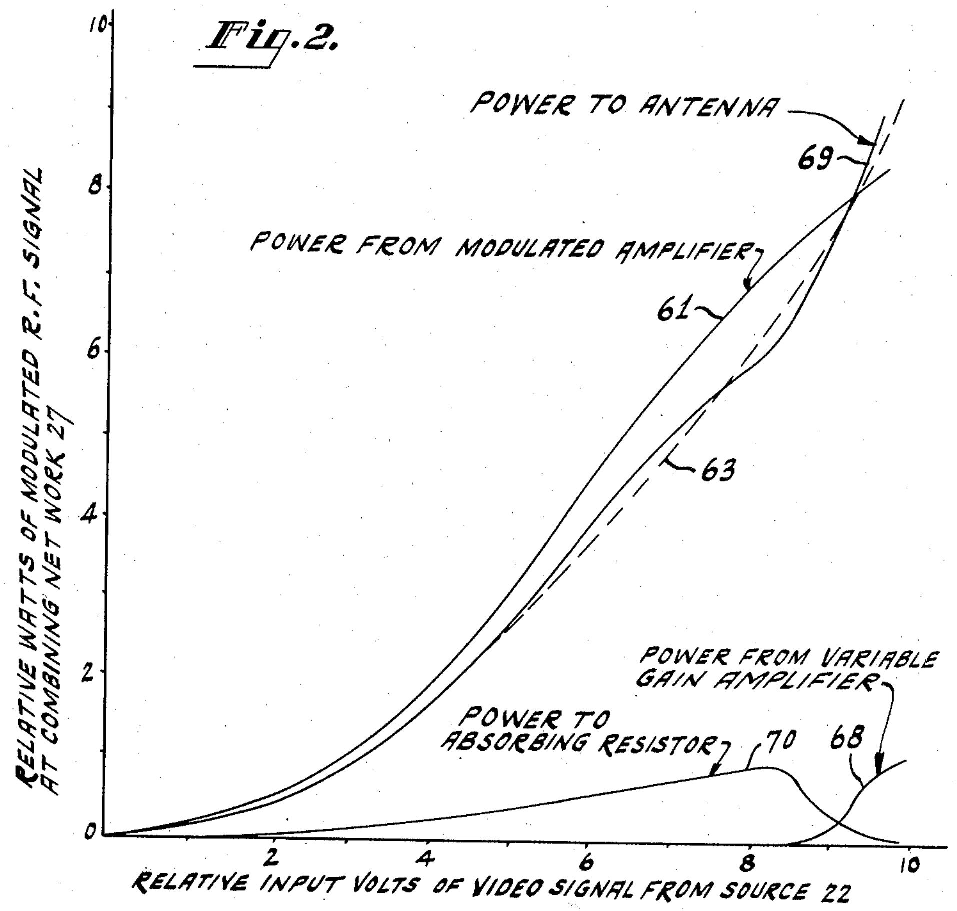
Figure 2 is a chart illustrating the performance of the system of Figure 1.

In the operation of the system of Figure 1, the radio frequency carrier from the source 20 is modulated in the modulated amplifier 10 by the video signal from the source 22 applied thru the modulator 14. The modulated radio frequency wave (60 in Fig. 3) from the modulated amplifier 10 is applied thru a radio frequency delay device 25 and thru a coaxial line 26 to the combining network 27. The power of the signal from the modulated amplifier 10 applied to the combining network 27 follows the curve 61 in the chart of Figure 2, as a function of the amplitude of the video signal from the source 22. Since the chart of Figure 2 shows output power vs. input volts, the desired linear relationship between the input video signal and the modulated radio frequency output signal is represented by the dashed parabolic curve 63. It is seen that the curve 61 for the power from the main modulated amplifier exhibits a decreasing slope at high amplitudes of the input video signal and departs considerably from the desired linear relationship as represented by the dashed line 63.

Figure 3:
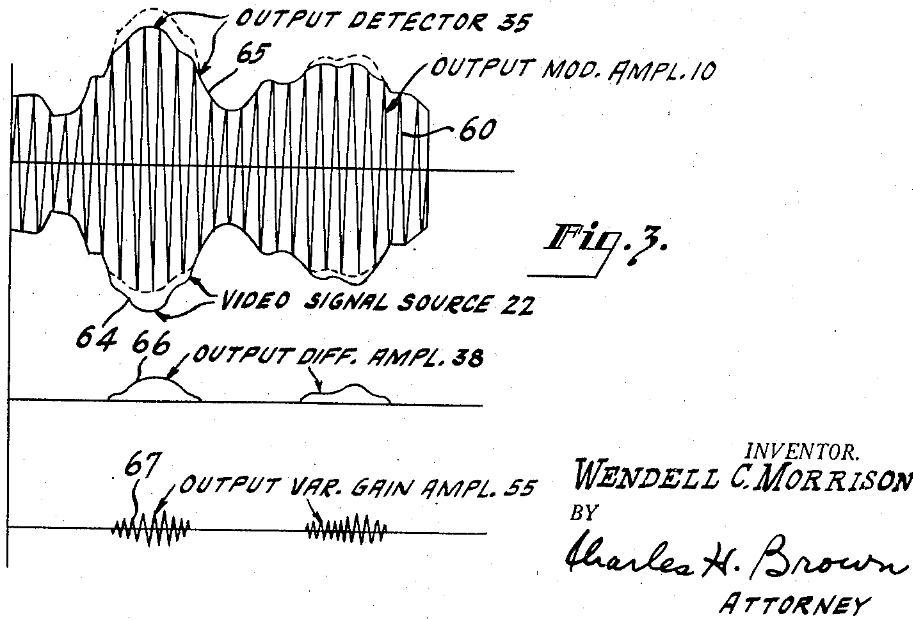
Figure 3 is a chart of voltage waveforms in the system of Figure 1.

The video signal (64 in Figure 3) from the source 22 is compared in the differential amplifier 38 with the video envelope (65 in Figure 3) obtained from the output of the modulated amplifier 10 by means of detector 35. The video delay line 45 provides an amount of delay equal to that inherent in the operation of the modulator 14 and the modulated amplifier 10 so that the two video signals 64 and 65 applied to the differential amplifier 38 are exactly in phase, but of opposite polarity. The variable tap 48 on the cathode resistor 47 in the video delay device 45 is adjusted so that at low levels of the video signal, the two video signals of opposite polarity applied to the differential amplifier 38 have the same amplitudes above and below a reference value. Therefore, the two signals to the differential amplifier 38 cancel each other and no output is obtained. At high amplitudes of the video signal, the signal applied to the differential amplifier 38 from the modulated amplifier 10 has a lower value than the signal applied directly from the source 22 thru the video delay device 45. This results in an output (66 in Figure 3) from the differential amplifier 38 which is proportional to the difference between the amplitudes of the two signals, and which is applied as a gain-controlling bias potential to the variable gain amplifier 55. The difference signal 66 applied to the variable gain amplifier 55 causes a corresponding amplification, in the variable gain amplifier 55, of the radio frequency carrier from the source 20. The output of the variable gain amplifier 55, having a waveform represented at 67 in Figure 3, is applied to the combining network 27. The modulated radio frequency signal applied to the combining network 27 from the modulated amplifier 10 is delayed in the relay line 25 by an amount such that the modulation envelope corresponds in time with the envelope of the radio frequency signal from the variable gain amplifier 55. The phases of the two radio frequency carriers are also made exactly equal by adjusting the lengths of lines 26 or 28, or by other means. The two signals then add together in the combining network 27 to provide a single modulated carrier having an envelope linearly related with the video signal from source 22.

The output power from the variable gain amplifier 55 may be as shown by curve 68 in the chart of Figure 2. It will be noted from the chart that there is no output from the variable gain amplifier 55 until the amplitude of the video signal exceeds a relative value of about 8.5. This is because the grid bias arrangement 58 is adjusted to keep the variable gain amplifier tube cut off in the absence of a difference signal from the differential amplifier 38. The variable tap 52 on the output resistor 51 of the differential amplifier 38 is adjusted to provide an amount of gain in the differential amplifier 38 to provide the desired amount of additional radio frequency energy from the variable gain amplifier 55.

The power from the output line 29 of the combining network 27 to the antenna may be as represented by the curve 69 in the chart of Figure 2. The power applied over line 30 from the combining network 27 to an absorbing resistor may be as represented by the curve 70 in the chart of Figure 2.

It can be seen from the chart of Figure 2 that the power applied to the antenna closely approximates the desired characteristic represented by the dashed curve 63. This characteristic represents a substantially linear relationship between the amplitude of the video modulating signal and the amplitude of the modulation envelope on the output radio frequency carrier.

What is claimed is:

1. A television transmitter comprising a modulated amplifier, a source of radio frequency carrier waves coupled to an input of said modulated amplifier, a modulator having an output coupled to an input of said modulated amplifier, a source of video modulating signals coupled to the input of said modulator, a differential amplifier having a pair of inputs, means to apply a video signal from said modulating signal source to one input of said differential amplifier, a detector having an input coupled to the output of said modulated amplifier and having an output coupled to another input of said differential amplifier, a variable gain amplifier, means to apply a radio frequency carrier wave from said carrier wave source to said variable gain amplifier, means to apply the output of said differential amplifier to said variable gain amplifier as a gain control voltage therefor, and means to combine the outputs of said modulated amplifier and said variable gain amplifier.

2. A radio transmitter comprising a modulated amplifier, a source of radio frequency carrier waves coupled to an input of said modulated amplifier, a modulator having an output coupled to an input of said modulated amplifier, a source of modulating signals coupled to the input of said modulator, a differential amplifier having two inputs, means to apply a modulating signal from said modulating signal source to one input of said differential amplifier, a detector having an input coupled to the output of said modulated amplifier and having an output coupled to another input of said differential amplifier, a variable gain amplifier, means to apply a radio frequency carrier wave from said carrier wave source to said variable gain amplifier, means to apply the output of said differential amplifier to said variable gain amplifier as a gain control voltage therefor, and means to combine the outputs of said modulated amplifier and said variable gain amplifier.

3. A television transmitter comprising a modulated amplifier, a modulator having an output coupled to an input of said modulated amplifier, a variable gain amplifier, a differential amplifier having two inputs and an output, said output being coupled to an input of said variable gain amplifier to control the gain thereof, a detector coupled from the output of said modulated amplifier to one input of said differential amplifier, means to apply a radio frequency carrier wave to inputs of said modulated amplifier and of said variable gain amplifier, means to apply a video signal to said modulator and to the other input of said differential amplifier, and means to combine the outputs of said modulated amplifier and said variable gain amplifier.

4. A television transmitter comprising a modulated amplifier, a modulator having an output coupled to an input of said modulated amplifier, a variable gain amplifier, an amplitude comparison circuit having two inputs and an output, said output being coupled to an input of said variable gain amplifier to control the gain thereof, a detector coupled from the output of said modulated amplifier to one input of said amplitude comparison circuit, means to apply a radio frequency carrier wave to inputs of said modulated amplifier and of said variable gain amplifier, means to apply a video signal to said modulator and to the other input of said amplitude comparison circuit, and means to combine the outputs of said modulated amplifier and said variable gain amplifier.

5. A radio transmitter comprising a modulated amplifier, a modulator having an output coupled to an input of said modulated amplifier, a variable gain amplifier, demodulating means coupled to the output of said modulated amplifier to recover the modulation therefrom, an amplitude comparison circuit having an input coupled to the output of said demodulating means, means to apply a radio frequency carrier wave to the inputs of said modulated amplifier and of said variable gain amplifier, means to apply a modulating signal to said modulator and to said amplitude comparison circuit, means to couple the output of said amplitude comparison circuit to said variable gain amplifier as a gain control voltage therefor, and means to combine the outputs of said modulated amplifier and said variable gain amplifier.

6. A television transmitter comprising a modulated amplifier, a source of radio frequency carrier waves coupled to an input of said modulated amplifier, a modulator having an output coupled to an input of said modulated amplifier, a source of video modulating signals coupled to the input of said modulator, an amplitude comparison circuit having two inputs, a video delay device, means to apply a video modulating signal from said modulating signal source and thru said video delay device to one input of said amplitude comparison circuit, a detector having an input coupled to the output of said modulated amplifier and having an output coupled to another input of said amplitude comparison circuit, a variable gain amplifier, means to apply a radio frequency carrier wave from said carrier wave source to said variable gain amplifier, means to apply the output of said amplitude comparison circuit to said variable gain amplifier as a gain control voltage therefor, a radio frequency delay device having an input coupled to the output of said modulated amplifier, and means to combine the outputs of said radio frequency delay device and said variable gain amplifier.

7. In a radio transmitter, means for modulating a carrier wave by modulating signals to produce a modulated carrier wave output, means receptive of a portion of said modulated carrier wave output for demodulating said modulated wave, thereby to recover signals of modulation frequency, an amplitude comparison circuit having two inputs and an output and adapted to produce a variable output voltage which varies in accordance with differences in the amplitudes of two input signals applied respectively to its inputs, means for applying said recovered modulation frequency signals to one input of said comparison circuit, means for applying said first-mentioned modulating signals to the other input of said comparison circuit, a variable gain amplifier having a signal input connection, a signal output connection, and a gain control connection, means for applying said first-mentioned carrier wave to said signal input connection, means for applying said variable output voltage to said gain control connection as a gain control voltage for said amplifier, and means coupled to said output connection and to the output of said first-mentioned means for combining the outputs of said amplifier and of said first-mentioned means.

8. In a radio transmitter, means for modulating a carrier wave by modulating signals to produce a modulated carrier wave output, means receptive of a portion of said modulated carrier wave output for demodulating said modulated wave, thereby to recover signals of modulation frequency, an amplitude comparison circuit having two inputs and an output and adapted to produce a variable output voltage which varies in accordance with differences in the amplitudes of two input signals applied respectively to its inputs, means for applying said recovered modulation frequency signals to one input of said comparison circuit, a modulating signal delay device, means for applying said first-mentioned modulating signals through said delay device to the other input of said comparison circuit, a variable gain amplifier having a signal input connection, a signal output connection, and a gain control connection, means for applying said first-mentioned carrier wave to said signal input connection, means for applying said variable output voltage to said gain control connection as a gain control voltage for said amplifier, and means coupled to said output connection and to the output of said first-mentioned means for combining the outputs of said amplifier and of said first-mentioned means.

9. In a radio transmitter, means for modulating a carrier wave by modulating signals to produce a modulated carrier wave output, means receptive of a portion of said modulated carrier wave output for demodulating said modulated wave, thereby to recover signals of modulation frequency, an amplitude comparison circuit having two inputs and an output and adapted to produce a variable output voltage which varies in accordance with differences in the amplitudes of two input signals applied respectively to its inputs, means for applying said recovered modulation frequency signals to one input of said comparison circuit, a modulating signal delay device, means for applying said first-mentioned modulating signals through said delay device to the other input of said comparison circuit, a variable gain amplifier having a signal input connection, a signal output connection, and a gain control connection, means for applying said first-mentioned carrier wave to said signal input connection, means for applying said variable output voltage to said gain control connection as a gain control voltage for said amplifier, a carrier wave delay device having an input coupled to the output of said first-mentioned means, and means coupled to said output connection and to the output of said carrier wave delay device for combining the outputs of said amplifier and of said carrier wave delay device.

10. In a television transmitter, means for modulating a radio frequency carrier wave by video modulating signals to produce a modulated carrier wave output, means receptive of a portion of said modulated carrier wave output for demodulating said modulated wave, thereby to recover signals of video frequency, an amplitude comparison circuit having two inputs and an output and adapted to produce a variable output voltage which varies in accordance with differences in the amplitudes of two input signals applied respectively to its inputs, means for applying said recovered video frequency signals to one input of said comparison circuit, means for applying said first-mentioned video signals to the other input of said comparison circuit, a variable gain amplifier having a signal input connection, a signal output connection, and a gain control connection, means for applying said radio frequency carrier wave to said signal input connection, means for applying said variable output voltage to said gain control connection as a gain control voltage for said amplifier, and means coupled to said output connection and to the output of said first-mentioned means for combining the outputs of said amplifier and of said first-mentioned means.

11. In a television transmitter, means for modulating a radio frequency carrier wave by video modulating signals to produce a modulated carrier wave output, means receptive of a portion of said modulated carrier wave output for demodulating said modulated wave, thereby to recover signals of video frequency, an amplitude comparison circuit having two inputs and an output and adapted to produce a variable output voltage which varies in accordance with differences in the amplitudes of two input signals applied respectively to its inputs, means for applying said recovered video frequency signals to one input of said comparison circuit, a video delay device, means for applying said first-mentioned video signals through said delay device to the other input of said comparison circuit, a variable gain amplifier having a signal input connection, a signal output connection, and a gain control connection, means for applying said radio frequency carrier wave to said signal input connection, means for applying said variable output voltage to said gain control connection as a gain control voltage for said amplifier, a radio frequency delay device having an input coupled to the output of said first-mentioned means, and means coupled to said output connection and to the output of said radio frequency delay device for combining the outputs of said amplifier and of said radio frequency delay device.

References Cited in the file of this patent

UNITED STATES PATENTS

| | | |
|---|---|---|
| 2,091,701 | Gravath | Aug. 31, 1937 |
| 2,163,670 | Ditcham | June 27, 1939 |
| 2,383,847 | Crosby | Aug. 28, 1945 |